Aug. 25, 1964  P. I. PEYCHES  3,146,019
CONSTRUCTION OF MOTOR VEHICLE BODIES
Filed July 6, 1959
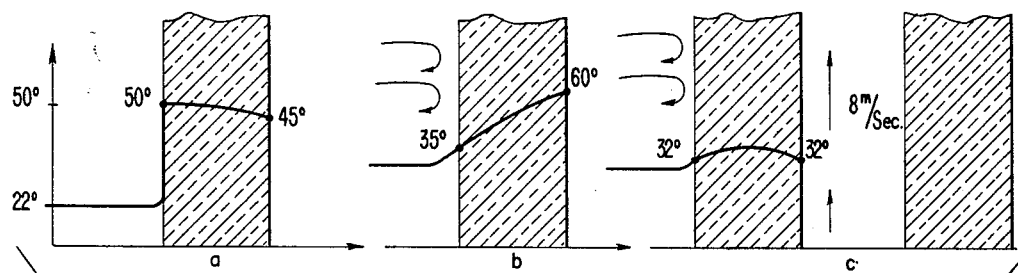
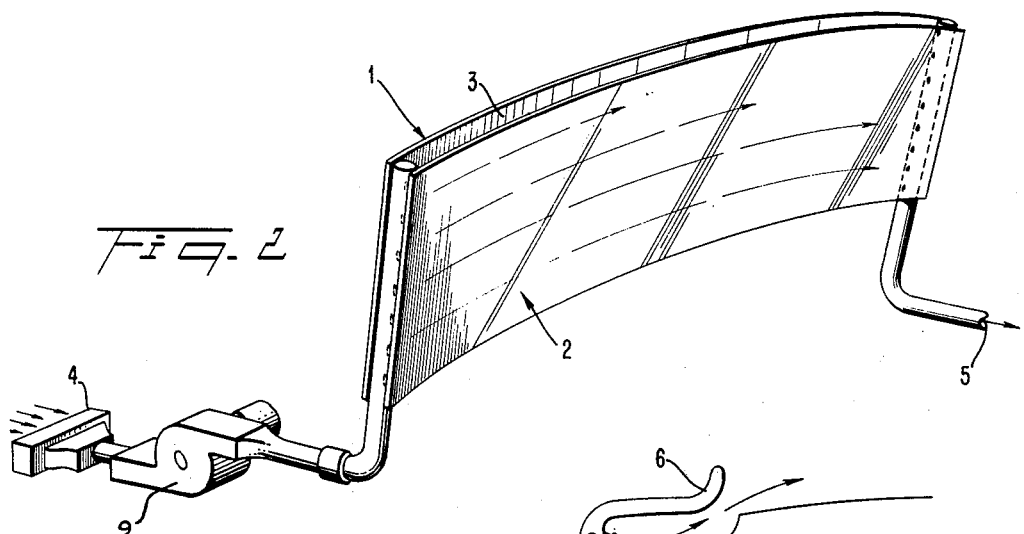
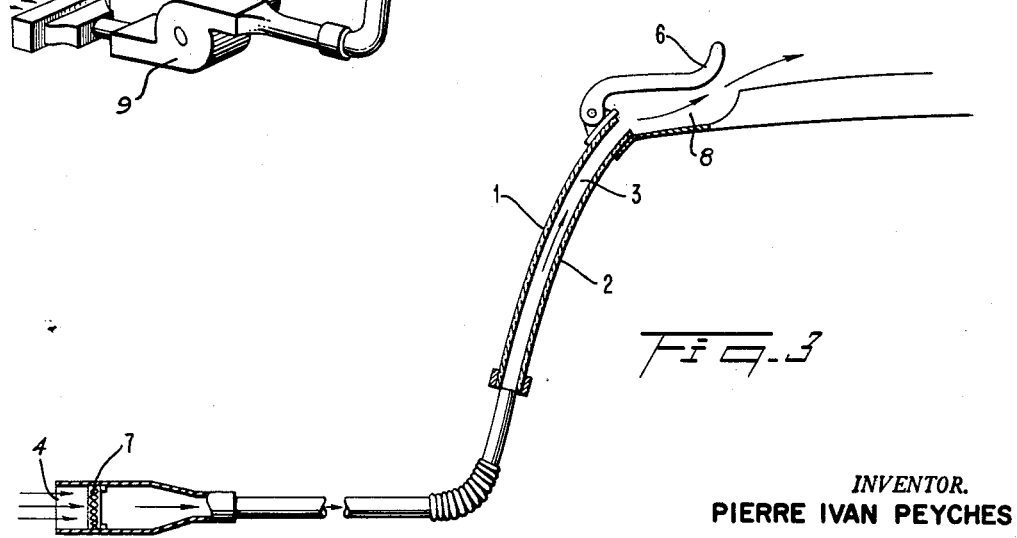
INVENTOR.
PIERRE IVAN PEYCHES
BY Bauer and Seymour
ATTORNEYS

United States Patent Office 3,146,019
Patented Aug. 25, 1964

3,146,019
CONSTRUCTION OF MOTOR VEHICLE BODIES
Pierre Ivan Peyches, Paris, France, assignor to Societe Anonyme des Manufactures des Glaces et Produits Chimiques de Saint-Gobain, Chauny et Cirey, Paris, France
Filed July 6, 1959, Ser. No. 824,991
5 Claims. (Cl. 296—84)

The present invention relates to improvements in the construction of motor-vehicle bodies to improve the thermal conditioning of the atmosphere inside these vehicles.

It is known to realize this thermal conditioning by forcing inside the body of the vehicle air streams taken from outside. If the problem is to heat the vehicle atmosphere the air streams are caused to recover the heat expended by the motor.

In this known process the volume of air introduced to obtain a comfortable temperature exceeds greatly the amount which would be sufficient to provide air for breathing, as well as controlling the humidity for the comfort of the passengers. Among other drawbacks, the result is an excessive drying of the atmosphere and eddy currents of air that create drafts and tend to be harmful for the passengers.

On the other hand, the increase of glazed surfaces in motor vehicles has caused a reduction of comfort, particularly on sunny days, by the penetration of solar rays into the motor vehicle.

To obviate this inconvenience it is known to utilize, for vehicle windows, glass sheets which absorb infrared rays, especially glasses containing a definite proportion of ferrous oxide, but due to the fact that the absorption of such glasses takes place in the depth of the sheet and that the cooling due to the movements of the vehicle takes place only on the outer face of the sheet, the temperature of the inner face of the sheet rises and there is produced an infra red radiation of greater wave-lengths so that the feeling of discomfort is not satisfactorily suppressed.

The present invention has for its object to remedy this inconvenience. According to the invention at least a part of the wall or the windshield or of the deck of the motor-car body is constituted by a glass which absorbs the infra red rays, and which is placed in external position and associated with a second glass placed in internal position, the space between the two glasses being swept by an air stream. With such a disposition the glass absorbing the infra red rays, that is practically the only glass to become appreciably heated, is cooled on its two faces and does not radiate heat towards the interior.

The air stream circulating between the two sheets of glass may be advantageously taken on the front face of the vehicle, the speed of circulation being then determined by the speed of the vehicle.

Further the circulation of the air may be controlled by known means such as blowers, vent shutters, etc.

The invention will be better understood in conjunction with the annexed drawings in which:

FIG. 1 represents temperature curves for a glass which absorbs infra red rays (a) without cooling,
(b) cooled on one face and
(c) cooled on the two faces.

FIG. 2 is a perspective view of windshield embodying the invention

FIG. 3 is a perspective view of another embodiment of the invention.

Referring now in details to the annexed drawings, FIG. 1a indicates the temperatures of a glass which absorbs infra red radiations without cooling. In an atmosphere submitted to a fresh breeze and for an ambient temperature of 22° C. under shelter, the temperature of this glass exceeds at the outer face 50° C. as shown in the temperature curve of FIG. 1a. For hot weather and wind of 30° C., the temperature of the glass may attain 70° C. This glass re-radiates as a black body with a maximal radiation for wave length of about 8 microns.

The moving of the vehicle produces a forced cooling of the outer face but the energy absorbed in the depth of the glass sheet and the low thermal conductivity of the glass hinder the cooling. FIG. 1b shows that in this case if the outer face of the glass is at 35° C., the inner face is at 60° C.

The present invention has for one object to provide a cooling action on both faces of the infra red absorbing glass. In this case shown in FIG. 1c when the outer face is at 35° C., and the cooling is performed at a rate of 8 m./sec. the inner face of the glass is at about 32° C. This produces a general lowering of the temperature curve, obvious on FIG. 1c.

The present invention has for another object to combine with the first sheet of infra red absorbing glass a second sheet of glass which is absorbent for the radiations of greater wave length. The maximum of this radiation is for wave lengths of about 9 microns. The ordinary silica glasses are absorbent for this field of radiations. In addition the inner face of the second sheet of glass is swept by the air stream and, consequently, efficiently cooled.

The embodiment of a windshield according to the invention illustrated in FIG. 2 comprises a front glass absorbing the infra red radiations (1), an ordinary glass (2) and between the two glasses a space (3) swept by the air stream. The air stream is taken in (4) at the front of the vehicle and is drawn up into the space between the two glass sheets. A selectively operated blower, such as that shown at 8 in FIG. 2, may be interposed in the pipe or tubing extending from the air intake 4 to the space 3 between the external and internal glass sheet, as indicated in FIG. 2.

The windshield embodying the invention represented in FIG. 3 comprises a sheet of glass absorbing the infra red radiations (1), an ordinary glass (2), a baffle 6 producing a depressed area or nozzle effect at the top of the space 3 of the windshield, forcing the air between the two sheets of the windshield, and out of the slot 8 toward the rear of the vehicle, and a dust-strainer 7 at the air entrance 4.

In glazings according to the invention, the glasses absorbing the infra red rays are fairly rapidly heated due to this absorption and in case they are submitted to sudden cooling, they have to support important thermal shocks that may produce their breakage. The invention has for a further object to use in such a case a glass having a relatively low thermal expansion coefficient.

The composition hereafter is given as an example of a glass suitable for absorbing infra red rays and having a thermal expansion coefficient of about $71.10^{-7}$. (For comparison, the thermal expansion coefficient of ordinary glass is 85 to $90.10^{-7}$.)

| | Percent |
|---|---|
| $SiO_2$ | 77.5 |
| $Al_2O_3$ | 4.5 |
| FeO (computed in $Fe_2O_3$ reduced by carbon) | 1.3 |
| CaO | 2.9 |
| MnO | 3.1 |
| $Na_2O$ | 10.7 |
| | 100.0 |

It may be understood that the details of construction and the composition that have been given hereabove are for the purpose of illustration only and not restrictive.

Variations therefrom may be made without departing from the spirit or scope of the invention.

What is claimed is:

1. A motor vehicle body for improving the thermal conditioning of the atmosphere inside the vehicle, said vehicle having a portion of the wall thereof made up of two generally parallel spaced sheets of glass constituting a transparent double wall, one of said sheets of glass being an external sheet having the outer face thereof contacted by the atmosphere outside the vehicle and the other of said sheets being an internal sheet having its inner face in contact with the atmosphere inside the vehicle, the glass of the external sheet being of higher infra red absorbing type than the internal sheet, and means to flow a stream of air through the space between the two sheets of glass and against the confronting faces thereof.

2. A motor vehicle body in accordance with claim 1 in which the roof of the car has a slot opening into the space between the external and internal sheets of glass, an opening is provided at the lower parts of said sheets for the admission of a flow of air, and a baffle is mounted pivotally on the roof of the car in position adjacent the said slot for selective movement toward and away from the slot to control the circulation of air between the said sheets.

3. A motor vehicle body in accordance with claim 1 wherein the external glass sheet has a low coefficient of thermal expansion.

4. A motor vehicle body according to claim 2 wherein the two sheets of glass constitute a windshield, and the space between the two sheets of glass is swept by said air flow, said air flow being admitted thereinto from the front of the vehicle body and evacuated from the slot in a direction rearwardly of the vehicle body.

5. A transparent closure for an automobile vehicle or the like comprising two sheets of glass constituting a transparent double wall the sheets of which are spaced apart to provide for a flow of air, the glass of the external sheet having high infra red ray absorption, the internal sheet having materially lower infra red ray absorption, means to admit air between the sheets, and suction means acting on the space between the two glass sheets to produce a vacuum in and a flow of air from said means to admit air, said flow passing through said space and over the inner surface of the high infra red sheet when the vehicle is in motion.

References Cited in the file of this patent
UNITED STATES PATENTS

| | | |
|---|---|---|
| 1,615,448 | Frank | Jan. 25, 1927 |
| 1,909,931 | Dickerson | May 23, 1933 |
| 2,030,258 | Knecht | Feb. 11, 1936 |
| 2,036,230 | Mulneaux | Apr. 7, 1936 |
| 2,102,454 | Bennett | Dec. 14, 1937 |
| 2,175,625 | Babcoke | Oct. 10, 1939 |
| 2,360,280 | Ralph et al. | Oct. 10, 1944 |
| 2,373,214 | Wolkenhauer | Apr. 10, 1945 |
| 2,444,976 | Brown | July 13, 1948 |
| 2,527,693 | Armstead | Oct. 31, 1950 |
| 2,655,452 | Barnes et al. | Oct. 13, 1953 |
| 2,755,212 | Brown | July 17, 1956 |
| 2,776,217 | Gott | Jan. 1, 1957 |
| 2,794,383 | Reynolds | June 4, 1957 |